Patented May 19, 1953

2,639,235

UNITED STATES PATENT OFFICE 2,639,235

CASEIN-LACTIC-ACID COMPOSITION

John G. Kennedy, Mason, and Finn W. Bernhart, Holt, Mich., assignors, by mesne assignments, to American Home Products Corporation, New York, N. Y., a corporation of Delaware No Drawing. Application March 23, 1951, Serial No. 217,304

6 Claims. (Cl. 99—20)

This invention relates to a casein-lactic-acid composition in the form of a free-flowing powder readily dispersible in milk or other liquid foods for dietary purposes.

In special diets it is often desired to add lactic acid and also to provide an increased protein content in the milk used. The direct addition of lactic acid to milk has several disadvantages. One is that lactic acid as the usual syrupy liquid is less convenient for general use than a free-flowing powder. Another is that the addition of syrupy lactic acid to milk causes local over-acidification and the resultant curd is likely to be coarse and quick-settling. Furthermore where an increased protein content is desired in the milk, such protein must be added and dispersed in a separate operation.

It is an object of our invention to overcome these disadvantages by providing a casein-lactic-acid composition in the form of a free-flowing powder which is readily dispersible in milk or other liquid foods, which lowers the pH of milk and increases its protein content, and which produces a smooth creamy curd having little tendency to separate.

We have discovered that such a composition may be made by adding lactic acid to an aqueous solution or suspension of an alkali or alkaline earth salt of casein or paracasein or to a suspension of isoelectric casein or paracasein in amounts and under the conditions described below, and spray-drying or otherwise drying the resulting mixture at non-deleterious temperatures.

The addition of lactic acid to milk for dietary purposes is well known, and we are aware that the combination of casein and lactic acid is broadly not new, but as far as we know no dried salt of casein and lactic acid equivalent to our composition has hitherto been disclosed or produced.

According to one embodiment of our invention we dissolve sodium caseinate in water at room temperature to form preferably a 7 to 8% solution and add N. F. VIII lactic acid slowly, with constant agitation, preferably in the ratio of 5 parts of N. F. VIII lactic acid to approximately 7 parts of casein. We then dry the mixture at a moderate temperature, preferably by spray-drying, to produce a solid product containing preferably not over 3% moisture. If spray-dried, the product is in sufficiently fine form; otherwise it may be comminuted in any convenient way.

The concentration of the casein solution is not critical, and may be varied within moderate limits, e. g. from 1% to 11%.

The ratio of lactic acid to casein may also be varied within reasonable limits without departing from our invention. Because of the large size of the casein molecule with its several reacting groups and its amphoteric character as well as its colloidal properties, no exact stoichiometric ratio can be set. The maximum acid-binding capacity of casein for highly ionized acids such as HCl may be taken as $80 \times 10^{-5}$ mols per gram, but at pH 3 it is about $40 \times 10^{-5}$ mols per gram. The alkali or alkaline earth metal in the caseinate also requires lactic acid, and some free lactic acid is desirable in our composition. But from a practical point of view, the major factor determining the range of lactic acid in our product is the effect of lactic acid on drying, particularly on spray-drying. We have determined that this ratio should be in the approximate range 0.20 g. to 1.00 g. N. F. VIII lactic acid per gram of casein.

Our composition in its finished form is thus a dry powder consisting essentially of casein, lactic acid, with or without alkali or alkaline earth lactates, and a small amount of water. The lactic acid is present in both free and combined form and the alkali or alkaline earth cations are present as the corresponding lactate. If isoelectric casein is used the composition does not contain metal lactates. The amount of free lactic acid will depend on the ratio of lactic acid to casein used and on whether a casein salt or isoelectric casein is used in making the composition. Small amounts of other materials which ordinarily accompany edible casein, such as traces of lactose, fat and mineral salts, may be present, but are without significance for our purpose.

In putting our composition to dietary use we prefer to blend it with milk in an approximate ratio of 3:100 by weight. For example, we may use 14.5 g. of our composition, containing 5 parts lactic acid to 7 of casein, to a pint of milk. This ratio may be varied considerably, depending on individual requirements; a practical range is from 2:100 to 7:100

Our composition may be conveniently blended with milk or other liquid foods by adding it in one portion to the milk or other liquid food in a shaker or stoppered bottle, shaking the mixture, and then allowing it to stand for a few minutes. The pH falls, rapidly at first and then more slowly, to a constant value, e. g. about pH 4.3, and a smooth creamy curd is formed. This gradual acidification eliminates the hard, locally very acid clots which are seen when N. F. VIII lactic acid is used for acidification. The addition of our composition also raises the protein content of the milk, e. g. to about 4.8%.

*Example I*

Four hundred and twenty grams sodium caseinate (83.5% protein) was dissolved in 5000 ml. water. To this solution 240 g. N. F. VIII (85%) lactic acid was slowly added with constant agitation. The mixture at first curdled and then slowly turned to a smooth paste. The pH of the mixture was 3.

The smooth paste was spray-dried at 190°-200° F. with a medium sized spray nozzle of the atomizer type, the liquid pressure being maintained at 20-30 lb. p. s. i. and the air pressure at 30-35 lb. p. s. i.

The resulting powder was added to milk in a stoppered bottle in the ratio of 14.5 g. powder per pint of milk, the bottle shaken and allowed to stand 10 minutes. During this time a smooth curd formed, the pH dropped to 4.3 and the protein content of the mixture was raised to 4.8%.

*Example II*

Twenty-four pounds of skim milk containing approximately 360 g. of protein was heated to 86° F. Two and two-tenths ml. of Marshall rennet diluted with 6.5 ml. of cold water was added to the milk slowly with gentle stirring. When all the rennet had been added the stirring was stopped and the mixture maintained at 86° F. for 30 minutes. At the end of this time the mixture was heated slowly to 200° F. and the curd cut and drained. After draining cold water was added to restore the original volume. The curd was allowed to settle and the supernatant wash water siphoned off. Five washings were carried out in this manner.

The drained, washed curd was resuspended in a gallon of water with vigorous stirring for 30 minutes to make a uniform slurry. Two hundred and forty g. N. F. VIII (85%) lactic acid was added slowly. Stirring was continued for two hours. At the end of this time all curd particles had been dispersed and the mixture was at pH 3.0. The mixture was then heated to 155° F. The protein dissolved. This mixture was water-thin and clear at about 120° F. and was a thin jelly at room temperature.

The solution was spray dried without difficulty at a temperature of 190°-200° F.

The resulting powder was fine, white, and fluffy and was soluble in water. 14.5 g. of the powder added to one pint milk clabbered the milk in about ten minutes to form a fine grained nonsettling curd. The clabbered milk had a pH of 4.35.

The resulting mixtures are adapted for feeding where a high-acid high-protein milk is required.

We claim:

1. A casein-lactic-acid composition in dry comminuted form containing 40% to 70% casein, 13% to 43% lactic acid, 0.2% to 0.9% sodium and not over 3% water, the sodium being present chiefly as sodium lactate, and the lactic acid being present partly in free and partly in combined form, said composition having the property on dispersion in milk of forming a smooth creamy curd.

2. A casein-lactic-acid composition in the form of a free-flowing powder containing casein, lactic acid and not over 3% water, the ratio of lactic acid to casein being in the approximate range 0.2:1.0 to 1.0:1.0 by weight, and the lactic acid being present in part in free form, said composition having the property on dispersion in milk of forming a smooth creamy curd.

3. An acid, high-protein, milk-base food composition comprising milk and dispersed therein a minor amount of the composition defined in claim 4, the milk-base food composition having a pH of approximately 4.3, the acidity being due substantially entirely to lactic acid, and a total protein content of approximately 4.8%, the casein being present in the form of a smooth, creamy, slow-settling curd.

4. The process of producing a dry comminuted casein-lactic-acid composition readily dispersible in milk which comprises: forming a dilute aqueous dispersion of a casein compound selected from the group consisting of the alkali and alkaline earth salts of casein and paracasein and isoelectric casein and paracasein, adding slowly with continuous agitation sufficient concentrated lactic acid to bring the reaction of the mixture to pH 3, maintaining the agitation to produce a uniform dispersion, and drying and comminuting the mixture at non-deleterious temperatures to form a dry free-flowing powder.

5. The process defined in claim 4 in which the casein compound is sodium caseinate, the casein dispersion contains approximately 7% to 8% sodium caseinate, the ratio of lactic acid to casein is in the approximate range 0.2:1.0 to 1.0:1.0 by weight and the drying and comminuting of the product are accomplished by spray-drying at a temperature below 212° F. until the moisture content is not above 3%.

6. The process defined in claim 4 in which the casein compound is isoelectric paracasein.

JOHN G. KENNEDY.
FINN W. BERNHART.

References Cited in the file of this patent

UNITED STATES PATENTS

| Number | Name | Date |
| --- | --- | --- |
| 1,646,228 | Zoller | Oct. 18, 1927 |
| 2,006,700 | Supplee et al. | July 2, 1935 |

OTHER REFERENCES

"Milk" by P. G. Heineman, published 1919 by W. B. Saunders Co., Phila., Pa., pages 86, 87, 88, 89, 90.